United States Patent [19]

Kasugai

[11] Patent Number: 4,588,102
[45] Date of Patent: May 13, 1986

[54] CAP WITH VALVE

[75] Inventor: Joji Kasugai, Ichinomiya, Japan

[73] Assignee: Toyoda Gosei Co., Ltd., Nishikasugai, Japan

[21] Appl. No.: 739,099

[22] Filed: May 30, 1985

[30] Foreign Application Priority Data

May 30, 1984 [JP] Japan .................. 59-79962[U]

[51] Int. Cl.$^4$ .............................................. B65D 51/16
[52] U.S. Cl. ................................. 220/203; 220/303;
220/DIG. 32; 137/493.9
[58] Field of Search ..................... 137/315, 493, 493.9;
220/203, 206, DIG. 32, DIG. 33

[56] References Cited

U.S. PATENT DOCUMENTS

| 4,079,855 | 3/1978 | Avrea | 220/203 |
| 4,498,493 | 2/1985 | Harris | 220/203 |
| 4,498,599 | 2/1985 | Avrea | 220/203 |
| 4,540,103 | 9/1985 | Kasugai et al. | 220/203 |

Primary Examiner—James C. Yeung
Attorney, Agent, or Firm—Cushman, Darby & Cushman

[57] ABSTRACT

A cap with valve of the invention comprises a cap body having a fluid flow path with a stepped portion, a first spring shoe plate having a locking plate, a first spring, a support plate having a plurality of locking legs to be engaged with the locking hole of the first spring shoe plate and fixing a seal member, a second spring shoe plate having a locking hole, a second spring, and a valve plate having a plurality of locking legs to be engaged with the locking hole of the second spring shoe plate. At the assembling state of parts, group of the first spring shoe plate, the first spring and the support plate fixing the seal member and group of the second spring shoe plate, the second spring and the valve plate are previously assembled through the locking holes and the locking legs respectively and engaged through the spring shoe plates to the cap body fluid flow path, and then engagement of the locking legs with the locking holes in respective groups is released and the parts are arranged.

3 Claims, 7 Drawing Figures

CAP WITH VALVE

BACKGROUND OF THE INVENTION

1. Field of the Invention

The present invention relates to a cap with valve, such as a fuel cap or a radiator cap for automobiles, which is installed to an aperture of a container such as a fuel tank or a radiator and adjusts pressure in the container by flowing fluid such as air out of the container or into the container from outside when the pressure in the container is positive or negative.

2. Description of the Prior Art

FIG. 1 shows inner structure of a cap with valve in the prior art, for example, a fuel cap to be installed to a filler neck of an automobile.

A fuel cap (hereinafter referred to as "cap") in FIG. 1 has inner structure where a cap body 1 to which an upper cover (not shown) is to be fitted is installed to a filler neck of a fuel tank and formed with a flow path 1a of fluid such as air, a spring shoe plate 2 is fixed by undercut to one end (top end) of the flow path 1a, a coil spring 3 is disposed at lower surface of the spring shoe plate 2, and an annular seal member 5 is fixed to bottom end of the coil spring 3 and a support plate 4 provided at the center with a fluid flowing hole 4a is arranged there. The annular seal member 5 is provided at outer circumferential portion with a lip element 5a abutting on a stepped portion 1b formed at inner circumference of the cap body fluid flow path 1a, and a valve plate 6 abuts on a lip element 5b at inner circumferential portion of the seal member 5 and is urged from other end (bottom end) of the cap body fluid flow path 1a so as to oppose the seal member 5 and close inner circumference of the seal member 5. A coil spring 7 to urge the valve plate 6 has bottom end abutting on a spring shoe plate 1c at bottom end of the cap body stepped portion 1b. In this connection, operation mode at positive pressure state and negative pressure state within the fuel tank will be described. When pressure in the fuel tank is positive, the seal member 5 and the support plate 4 are elevated against the biasing force of the spring 3, and since the outer lip element 5a of the seal member and the stepped portion 1b of the cap body are separated from each other, fluid such as air in the tank flows through the gap (refer to arrow indication →). On the contrary, when the pressure in the fuel tank is negative, the valve plate 6 is lowered against the biasing force of the spring 7, and since the inner lip element 5b of the seal member and the valve plate 6 are separated from each other, fluid such as air flows in the tank through the gap (refer to arrow indication →).

In the prior art, however, parts are assembled in sequence of the coil spring 7, the valve plate 6, the support plate 4 with the seal plate 5 fixed thereto, the coil spring 3, and the spring shoe plate 2 one after another. In this constitution, the number of parts to be inserted in the cap body fluid flow path 1a becomes large, the assembling work is troublesome, and the assembling in the shifted state of parts may be caused.

SUMMARY OF THE INVENTION

An object of the invention is to provide a cap with valve wherein parts of a valve unit in two groups are temporarily held to correct center positions respectively and engaged in this state with a fluid flow path of a cap body, and then the temporarily held state is released and the parts are assembled to the cap body, whereby operability of the assembling is improved and shifting of parts during the assembling is prevented.

Above object can be attained by a cap with valve, wherein a spring shoe plate is engaged with one end of a liquid flow path in a cap body, an annular seal member is fixed to a support plate being urged through a first spring from the spring shoe plate and having a fluid flowing hole, outer circumferential portion of the seal member abuts on a stepped portion formed at inner circumference of the cap body fluid flow path, and a valve plate abuts on inner circumferential portion of the seal member and is urged through a second spring from side of other end of the cap body fluid flow path so as to oppose the seal member and close the inner circumferential portion of the seal member, characterized in that the spring shoe plate is formed with a locking hole, the support plate is formed with a plurality of locking legs to be engaged with the locking hole of the spring shoe plate by deformation with spring action, a second shoe plate for a second spring for urging the valve plate is provided with a locking hole and engageable with end of the cap body stepped portion, the valve plate is formed with a plurality of locking legs being engageable with the locking hole of the second spring shoe plate by deformation with spring action, whereby group of the first spring shoe plate, the first spring and the support plate fixing the seal member and group of the second spring shoe plate, the second spring and the valve plate are previously assembled through the locking holes and the locking legs respectively and engaged to the cap body fluid flow path through respective spring shoe plates, and then the engaging state of the locking legs with the locking holes is released and the support plate and the valve plate are arranged.

DESCRIPTION OF PREFERRED EMBODIMENTS

Figure 1:
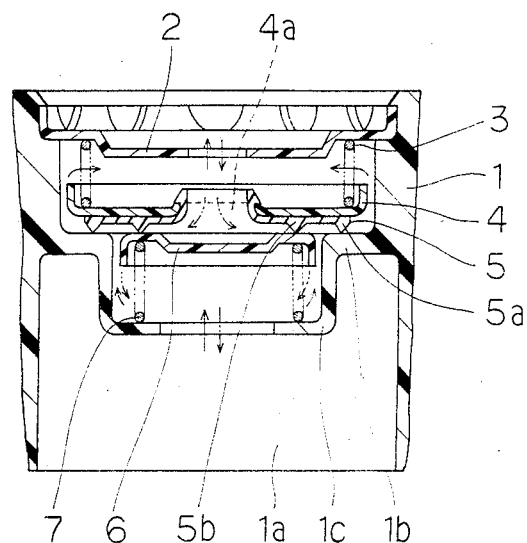
FIG. 1 is a fragmentary sectional view of a cap in the prior art.

A cap 10 as an embodiment of the invention is a fuel cap to be installed to a filler neck 20 of a fuel tank for a conventional automobile. The cap 10 is composed of a cap body 11 made of plastic material such as polyacetal in cylindrical form, and an upper cover 22 made of plastic material such as nylon in disc-like form and fitted to a flange 21 on upper end of the cap body 11 and provided with a grasping portion 22a. In order to prevent overtightening of the cap 10 to the filler neck 20, the upper cover 22 is formed at rear surface with a ratchet projection 22b, and a resilient finger 21a is formed at outer circumference of the flange 21 of the cap body 11 and provided at top end with a locking pawl 21b being engageable with the ratchet projection 22b.

A thread 11c for installing the filler neck 20 is provided on outer circumference of the cap body 11, and a seal ring 19 is installed on outside of lower surface of the flange 21.

A flow path 11a for fluid such as air in the tank is formed at inside of the cap body 11, and a stepped portion 11b is formed on inner circumference of the flow path 11a.

A seal member 15 of elastmer, a support plate 14 of plastic material such as polyacetal, a valve plate 16, a spring shoe plate 12 for the support plate 14, a second spring shoe plate 18 for the valve plate 16 and coil springs 13, 17 are arranged in the fluid flow path 11a.

The first spring shoe plate 12 for the support plate 14 is of disc-like form and fixed by undercut to the cap body 11 at upper end of the fluid flow path 11a of the cap body. A locking hole 12a for a support plate locking leg 14b as hereinafter described is formed at the center of the first spring shoe plate 12 and serves also as a flow path for fluid such as air.

Figure 4:
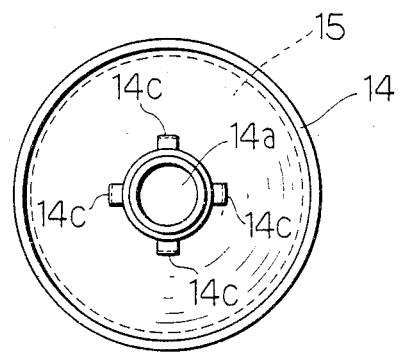
FIG. 4 is a plan view of a support plate fixing a seal member in the embodiment.

As shown in FIG. 4, the support plate 14 urged by the coil spring 13 from the spring shoe plate 12 is a ring body provided at the center with a fluid flowing hole 14a, and four locking legs 14b are formed at peripheral edge of the fluid flowing hole 14a and engaged with the locking hole 12a of the spring shoe plate 12 by deformation with spring action and provided with hooks 14c at respective top ends. An annular seal member 15 with lip portions at an outer circumferential portion 15a and an inner circumferential portion 15b is fixed to bottom surface of the bottom plate 14 by means of fitting, adhering, welding, plating or the like.

The seal member 15 is urged by the coil spring 13 at an outer lip element 15a and abuts on a cap body stepped portion 11b.

Figure 5:
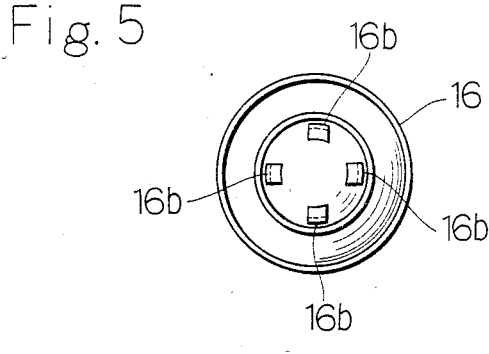
FIG. 5 is a bottom view of a valve plate in the embodiment.

The valve plate 16 of disc-like form is opposed to and abuts on the inner lip element 15b in the seal member 15 and is urged by the coil spring 17 from bottom end side of the fluid flow path 11a of the cap body 11, and inner circumference of the seal member 15 is closed by the valve plate 16. As shown in FIG. 5, the valve plate 16 is formed at bottom surface with four locking legs 16a each having a hook 16b on top end.

Figure 6:
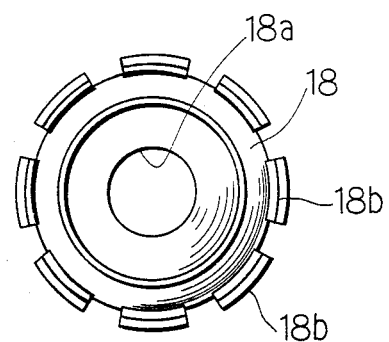
FIG. 6 is a bottom view of a second spring shoe plate for the valve plate in the embodiment.

The second spring shoe plate 18 of annular form to be engaged with bottom end of the cap body stepped portion 11b is engaged with bottom end of the coil spring 17 through hook portions 18b formed on peripheral edge of the spring shoe plate 18 (refer to FIG. 6). The center hole of the spring shoe plate 18 is a locking hole 18a for the valve plate locking legs 16a and serves also as a flowing hole of fluid such as air.

Figure 7:
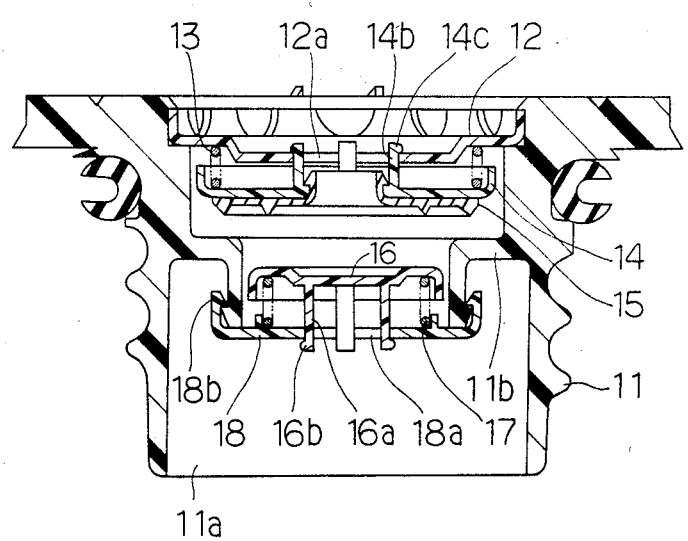
FIG. 7 is a sectional view of the embodiment illustrating the assembling state.

Assembling of the valve unit in the cap 10 of the invention will now be described (refer to FIG. 7).

First, group of the first spring shoe plate 12, the coil spring 13 and the support member 14 fixing the seal member 15 and group of the valve plate 16, the coil spring 17 and the second spring shoe plate 18 are temporarily held respectively. In the group of the first spring shoe plate 12, the coil spring 13 and the support plate 14 fixing the seal member 15, the hook portions 14c in the support plate locking legs 14b are engaged with the spring shoe plate locking hole 12a through the spring 13 and temporarily held. In the group of the valve plate 16, the coil spring 17 and the second spring shoe plate 18, the hook portions 16b in the valve locking legs 16a are engaged with the spring shoe plate locking holes 18a through the spring 17 and temporarily held. In this case, parts in each group are temporarily held at correct center positions respectively.

The group of the first spring shoe plate 12 is engaged with top end of the cap body fluid flow path 11a by means of undercut fixing of the spring shoe plate 12, and the group of the second spring shoe plate 18 is engaged with bottom end of the cap body fluid flow path 11a by locking the hook portions 18b of the spring shoe plate 18 to bottom end of the cap body stepped portion 11b.

Figure 2:
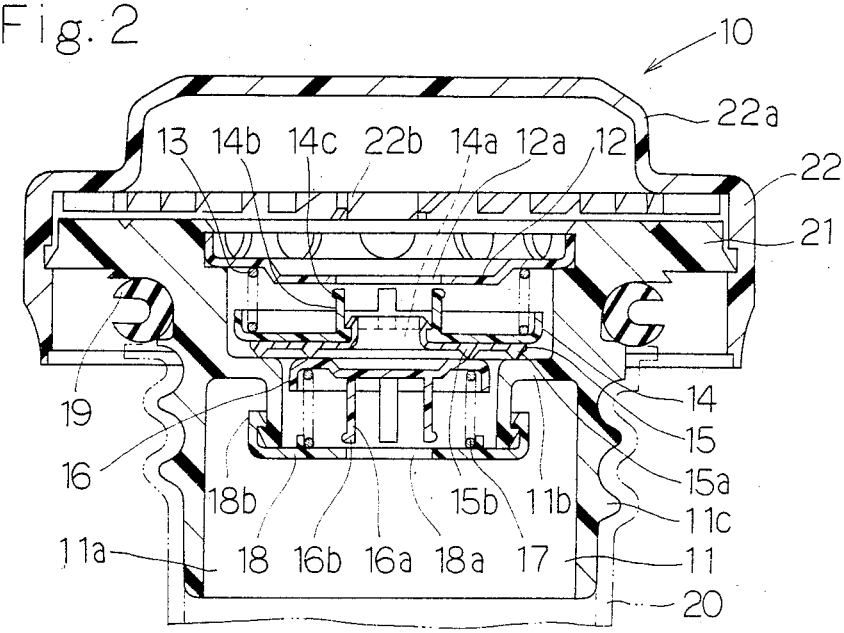
FIG. 2 is a sectional view of a cap as an embodiment of the invention.
Figure 3:
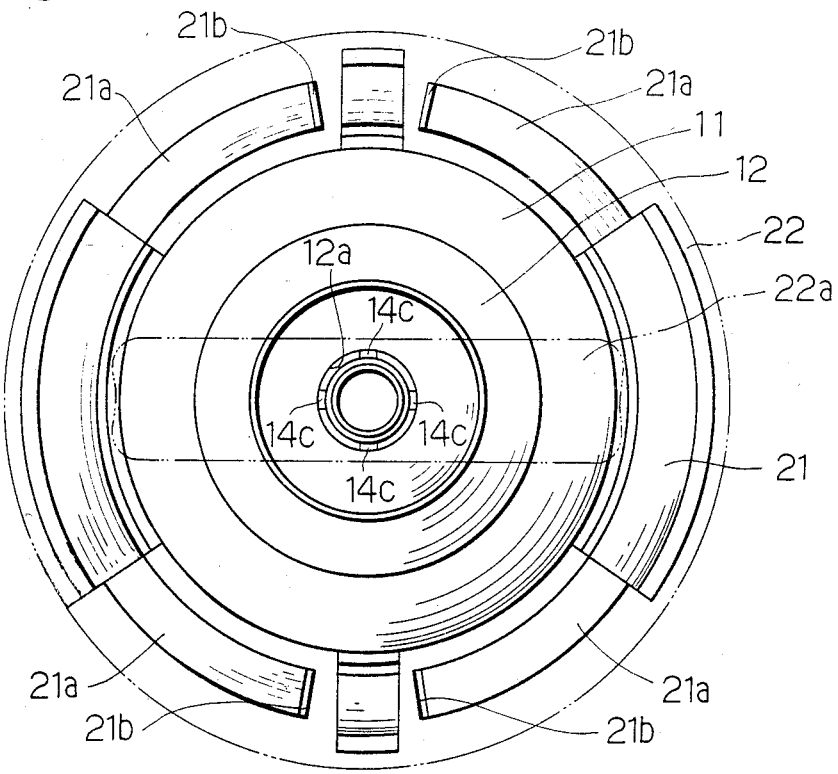
FIG. 3 is a plan view of the embodiment where an upper cover is removed.

If the locking legs 14b, 16a of the support plate 14 and the valve plate 16 are bent inwards and disengaged from the locking holes 12a 18a of the spring shoe plates 12, 18 respectively, the support plate 14 fixing the seal member 15 and the valve plate 16 are urged by biasing force of the springs 13, 17 respectively to prescribed position as shown in FIG. 2 thus assembling of the valve unit in the cap 10 is finished. Further if the upper cover 22 is fitted thereto, assembling of the cap 10 is finished.

Operating mode of the valve unit in the cap 10 is similar to conventional manner.

Accordingly, in the cap 10 of the embodiment, since parts of the valve unit in two groups are temporarily held respectively at correct center positions and engaged in this state with the cap body fluid flow path and then released from the temporarily fixed state so as to assemble the parts to prescribed positions in the cap body, operability of assembling work is improved and shifting of parts during assembling is prevented in comparison to conventional manner where parts are assembled one after another in sequence.

Although the spring shoe plate 18 at side of the valve plate 16 is engaged with outside of bottom end of the cap body stepped portion 11b in the embodiment, it may be engaged with inside of the cap body stepped portion 11b in similar manner to the spring shoe plate 12 engaged with top end of the cap body fluid flow path 11a.

Also in the embodiment, although group of the first spring shoe plate 12, the coil spring 13 and the support plate 14 fixing the seal member 15 is engaged to top end side of the cap body fluid flow path 11a through the first spring shoe plate 12 and group of the valve plate 16, the coil spring 17 and the second spring plate 18 is engaged to bottom end side of the cap body fluid flow path 11a through the second spring shoe plate 18 respectively, group at side of the valve plate 16 may be engaged to bottom end side of the cap body fluid flow path 11a by changing the engaging manner of the spring shoe plate 18. In addition, since groups may be engaged to different sides in the embodiment, there is little interference of other parts and operability of the assembling work is good.

Further in the embodiment, although the lip element is formed at the inner circumferential portion 15b of the seal member 15, the lip element formed there may be omitted if it is formed on prescribed position at side of the valve plate 16.

What is claimed is:
1. A cap with valve comprising:
 (a) a cap body having a fluid flow path and a stepped portion provided on inner circumference of the fluid flow path;
 (b) a first spring shoe plate having a locking hole and engaged with opposite side to said stepped portion at one end of said cap body fluid flow path;
 (c) a first spring arranged on said first spring shoe plate;

(d) an annular seal member with outer circumferential portion abutting on the stepped portion of the cap body fluid flow path;

(e) a support plate having a fluid flowing hole and a plurality of locking legs to be engaged with the locking hole of said first spring shoe plate by deformation with spring action, said support plate fixing said seal member and being disposed in the cap body fluid flow path and making the outer circumferential portion of the seal member abut on the stepped portion by means of biasing force of the first spring arranged on the first spring shoe plate;

(f) a second spring shoe plate having a locking hole and engaged with end of the stepped portion at other end of the cap body fluid flow path;

(g) a second spring arranged on said second spring shoe plate; and (h) a valve plate having a plurality of locking legs to be engaged with the locking hole of said second spring shoe plate by deformation with spring action, said valve plate being disposed in the cap body fluid flow path and closing the inner circumferential portion of the seal member by means of biasing force of the second spring arranged on the second spring shoe plate, Whereby at the assembling work, group of the first spring shoe plate, the first spring and the support plate fixing the seal member and group of the second spring shoe plate, the second spring and the valve plate are previously assembled through the locking holes and the locking legs respectively and engaged through the spring shoe plates to inside of the cap body fluid flow path, and then the engaging state of the locking legs with the locking holes is, released and the support plate and the valve plate are arranged.

2. A cap with valve as set forth in claim 1, wherein said first spring shoe plate and said second spring shoe plate in the assembling state are inserted and engaged to said cap body fluid flow path from reverse directions with each other.

3. A cap with valve as set forth in claim 1, wherein said first spring shoe plate and said second spring shoe plate in the assembling state are inserted and engaged to said cap body fluid flow path from the same direction.

* * * * *